United States Patent
Spickermann

(10) Patent No.: US 6,407,837 B1
(45) Date of Patent: Jun. 18, 2002

(54) USE OF BANDWIDTH EFFICIENT MODULATION TECHNIQUES IN A WAVELENGTH DIVISION MULTIPLEXED OPTICAL LINK

(75) Inventor: Ralph Spickermann, Redwood City, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/200,029

(22) Filed: Nov. 25, 1998

(51) Int. Cl.$^7$ ................................................ H04J 14/02
(52) U.S. Cl. ...................................... 359/124; 359/162
(58) Field of Search .............................. 359/124, 181, 359/173; 348/457; 455/45, 103, 203

(56) References Cited

U.S. PATENT DOCUMENTS

| | | | |
|---|---|---|---|
| 5,016,242 A | * 5/1991 | Tang | 359/124 |
| 5,339,184 A | * 8/1994 | Tang | 359/124 |
| 5,640,423 A | * 6/1997 | Archer | 375/261 |
| 5,896,211 A | * 4/1999 | Watanabe | 359/124 |
| 6,185,201 B1 | * 2/2001 | Kiyanagi et al. | 370/343 |

* cited by examiner

Primary Examiner—Jason Chan
Assistant Examiner—Christina Y Leung
(74) Attorney, Agent, or Firm—Kenneth W. Float

(57) ABSTRACT

Systems and methods that improve data transmission over a wavelength division multiplexed optical link. First and second wavelength division multiplexed modulators modulate data for transmission onto a microwave carrier signal to produce first and second carrier signals having a first carrier frequency. A downconverter downconverts the first carrier signal to a lower carrier frequency. A combiner combines the downconverted and second carrier signals to provide a composite microwave signal. A wavelength division multiplexed transmitter transmits the composite microwave signal on a wavelength division multiplexed channel over an optical fiber. A wavelength division multiplexed receiver reproduces the composite microwave signal transmitted over the optical fiber. A splitter and filters separate out the downconverted and second carrier signals from the composite microwave signal. An upconverter upconverts the downconverted carrier signal from the lower carrier frequency to the first carrier frequency. Demodulators demodulates the upconverted and second carrier signals to generate the originally transmitted data. The systems and methods use higher order modulated microwave carriers (M-ary ASK, PSK, QAM, etc.) to intensity modulate the optical carrier. As a result, more than 1 bit/Hz of optical channel can be transmitted.

15 Claims, 4 Drawing Sheets

On-Off Keying Spectrum (1 bit/Hz max)

BEM MICROWAVE SPECTRUM THAT MODULATES THE OPTICAL CARRIER

BEM OPTICAL SPECTRUM FOR ONE WDM CHANNEL (2 bit/Hz)

USE OF BANDWIDTH EFFICIENT MODULATION TECHNIQUES IN A WAVELENGTH DIVISION MULTIPLEXED OPTICAL LINK

BACKGROUND

The present invention relates generally to fiber optic communications systems and methods, and more particularly, to the use of bandwidth efficient modulation techniques to transmit information over a wavelength division multiplexed (WDM) optical link.

Previous solutions for transmitting information over a wavelength division multiplexed link involved increasing the speed of simple on-off-keying until the capacity of a given WDM carrier passband is filled. Unfortunately, simple on-off-keying is limited to 1 bit/Hz at best. Moreover, increasing the speed of on-off-keying requires increasingly expensive and noise sensitive electronics.

Numerous patents have been issued relating to transmission of data via optical communication systems that were uncovered in a search relating to the present invention. These patents disclose apparatus and methods relating to optical modulators, intermodulation products, amplifiers, receivers, heterodyne communication frequency multiplexed carriers, linearizers, signal sources, frequency division multiplexing, intensity modulation, mixers, spread spectrum CDMA systems, harmonic interference, optical carrier filtering, and polarization schemes. However, these patents do not address systems or methods that intensity modulate an optical carrier with one or more microwave carriers that are higher order modulated.

Therefore, it would be advantageous to have systems and methods that improve data transmission over a wavelength division multiplexed optical link.

SUMMARY OF THE INVENTION

The present invention increases the data rate capacity per optical carrier on a wavelength division multiplexed (WDM) system with carrier spacing of 100 GHz or less. The present invention intensity modulates an optical carrier with one or more microwave carriers that have been higher order modulated (M-ary ASK, PSK, QAM, etc.). As a result, more than 1 bit/Hz of optical channel can be transmitted.

More specifically, the present invention provides for systems and methods that improve transmission of information over a wavelength division multiplexed optical link. One or more bandwidth efficient modulation (BEM) modulators for modulating data for transmission are used. The BEM modulators use microwave carrier signals at a predetermined first carrier frequency. The modulators incorporate filtering so that only the main spectral lobe remains, and may also incorporate pre-equalization to compensate for non-ideal link aspects. Among these aspects are fiber dispersion and the higher order terms in the optical spectrum generated by the intensity modulation of the optical carrier. The optical carrier is intensity, not amplitude modulated.

Frequency converters are then used to shift the lobes to frequencies such that they may be combined into a composite microwave spectrum that most efficiently uses the WDM channel passband. This composite microwave signal is then used to intensity modulate the WDM optical carrier. This WDM optical carrier is then transmitted on a fiber and received using normal WDM optical apparatus. The received composite microwave spectrum of each WDM channel is then processed as appropriate, in that the lobes are separated with filters, shifted to their original frequencies and demodulated to generate the originally transmitted data.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
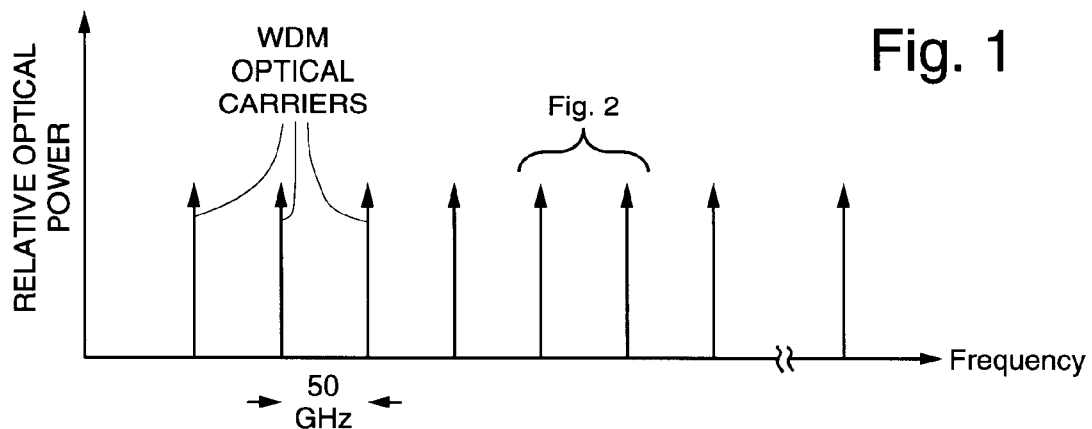
FIG. 1 illustrates an unmodulated optical spectrum of a typical wavelength division multiplexed system.

Referring to the drawing figures, FIG. 1 shows an unmodulated optical spectrum of a typical wavelength division multiplexed (WDM) system. There are multiple, evenly-spaced optical carriers used in the WDM system. The spacing increment is typically in the range of 50 GHz to 200 GHz. FIG. 1 shows a 50 GHz spacing situation. There is a symmetric passband around each of these optical carriers (shown in FIG. 2).

Figure 2:
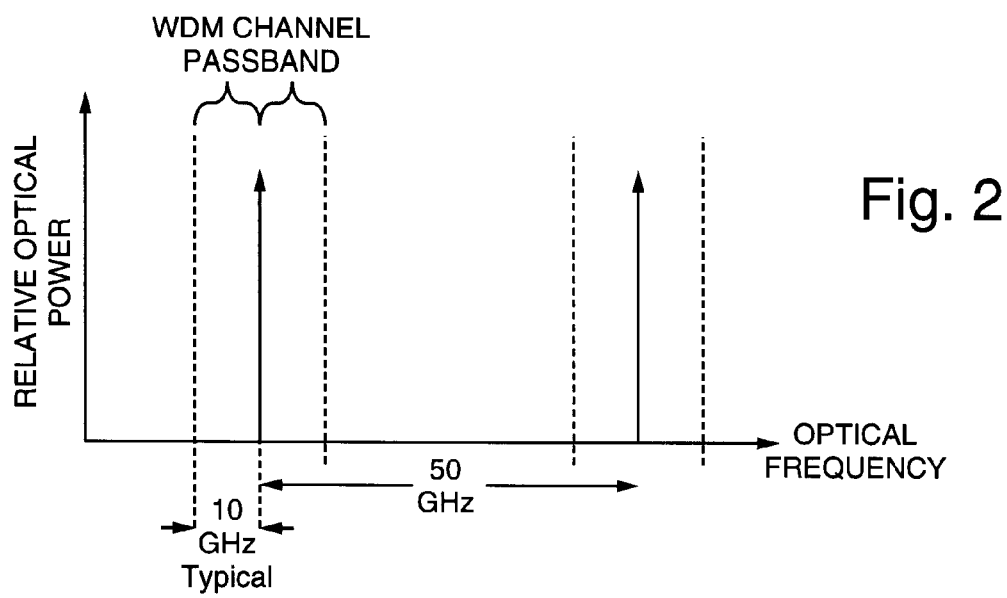
FIG. 2 illustrates more detailed version of FIG. 1 showing two adjacent carriers and their associated link passbands.

FIG. 2 is a more detailed version of FIG. 1 showing two adjacent carriers and their associated link passbands. Because the transmitted microwave data spectrum is mirrored around the optical carrier, the microwave link passband is half the total optical passband of the WDM optical channel.

For a 50 GHz system, an optical passband extending 10 GHz on either side of the carrier is typical. The passbands are determined by imprecision in the laser carrier spacing, laser frequency drift and the rolloff and tolerances of optical filters at the receiver that separate out the different carriers, and resultant crosstalk between adjacent WDM channels.

There is an advantage to narrowing the carrier spacing, because more carriers can be accommodated by erbium doped fiber amplifiers (EDFAs) used along optical links. A typical erbium doped fiber amplifier has a bandwidth of about 4000 GHz. However, as the carrier spacing narrows, so does the passband for each carrier. This is where the bandwidth conserving modulation techniques in accordance with the principles of the present invention are employed, as will be discussed below.

Figure 3A:
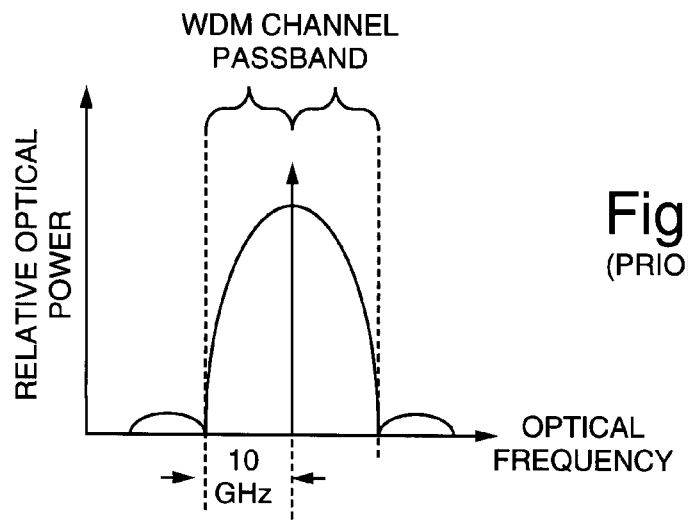
FIG. 3a shows a spectrally limited on-off keying scheme employed in prior art systems.

For a microwave passband width of 10 GHz, simple on-off keying (OOK) used in prior art systems is spectrally limited to 10 Gbits/second. However, for example, a 5 bit/symbol 32 QAM modulation (BEM) code at 2 Gigasymbols/second can put 10 Gbits/second into a 4 GHz passband. Based upon the signal to noise ratio achievable on typical optical fiber links, 5 bits/symbol or better is possible. The on-off keying spectrum for 10 Gbits/second is illustrated in FIG. 3a. Exemplary microwave and optical BEM coding spectra in accordance with the present invention are illustrated in FIGS. 3b and 3c.

Figure 3B:
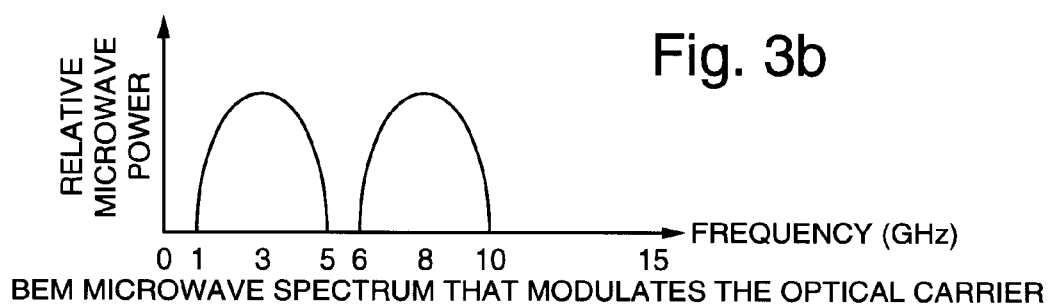
FIG. 3b shows a composite BEM microwave spectrum with which a WDM optical carrier is modulated in accordance with the principles of the present invention.
Figure 3C:
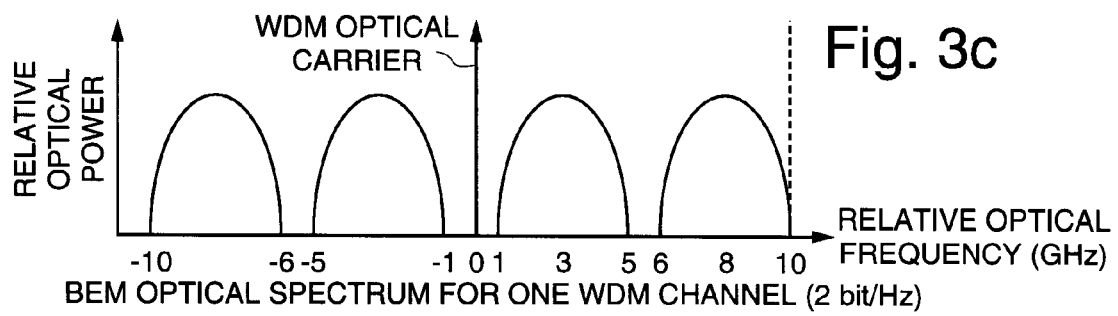
FIG. 3c shows BEM coding of the WDM optical carrier in accordance with the principles of the present invention.

The composite BEM coding spectrum shown in FIGS. 3b and 3c cannot be achieved by directly modulating 3 GHz and 8 GHz microwave carriers at 2 Gigasymbols/second. For the 3 GHz carrier, it is necessary to first modulate a higher frequency carrier (8 GHz for simplicity) and then downconvert to 3 GHz. At the receiver, there must be a corresponding upconversion from the lower frequency carrier to the higher frequency carrier. This is shown using 3 GHz as an example in FIG. 4, which is a block diagram of an exemplary system 10 in accordance with the principles of the present invention.

Figure 4:
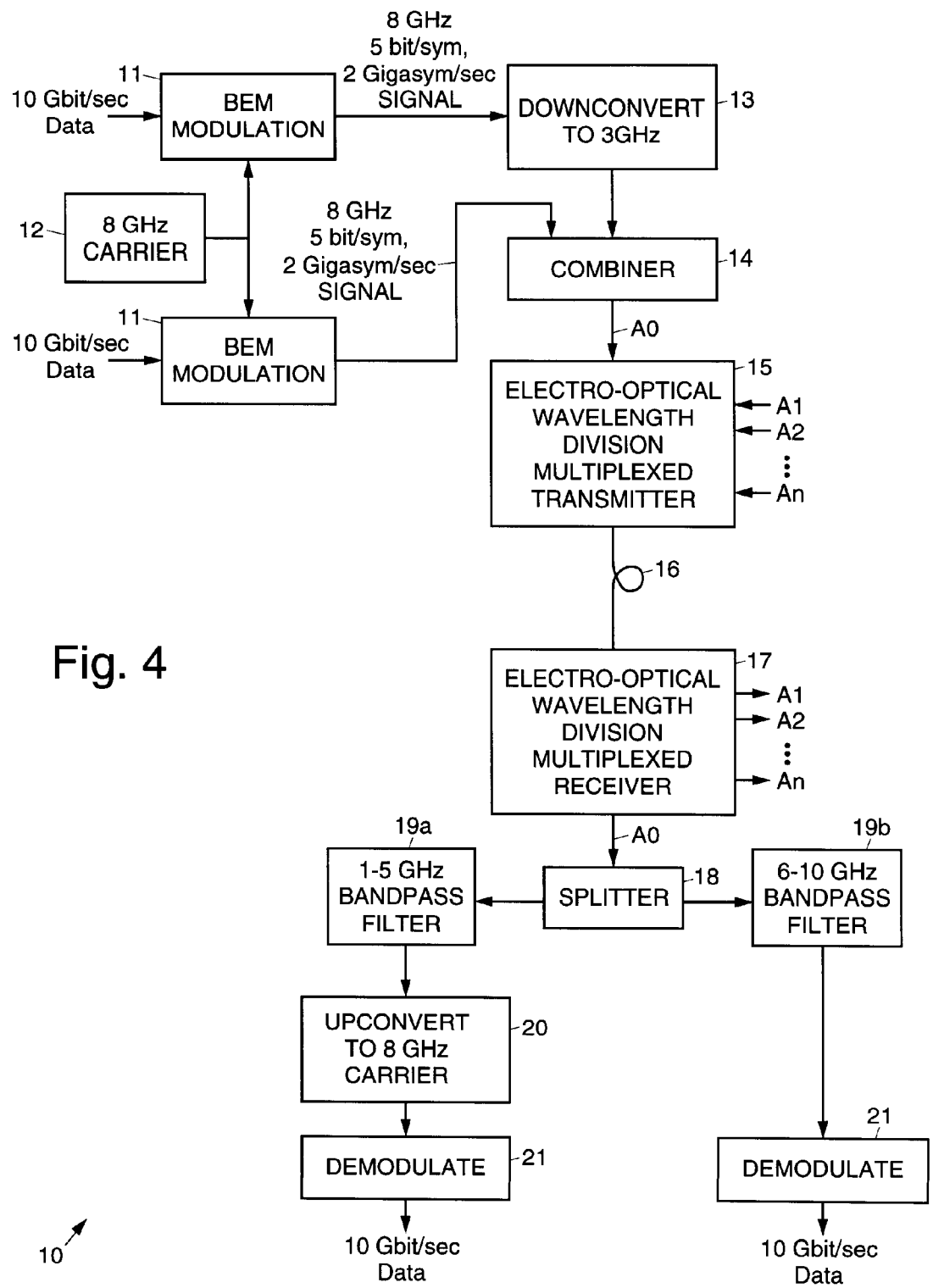
FIG. 4 illustrates an exemplary 20 Gbit aggregate bit rate system in accordance with the principles of the present invention for transmitting information over a WDM fiber optic link.

Referring to FIG. 4, the present exemplary system 10 utilizes two 5 bit/symbol, 2 Gigasymbol/second BEM modulators 11 that are used to amplitude modulate data for transmission using an 8 GHz microwave carrier generated by a carrier source 12. The BEM modulators 11 output a 8 GHz carrier signal containing the data that is to be transmitted. One 8 GHz carrier signal is downconverted to 3 GHz carrier signal in a downconverter 13. The downconverted 3 GHz carrier signal and the unconverted 8 GHz carrier signal are combined in a combiner 14 into a composite 20 Gbit/second aggregate microwave signal whose spectrum has two 10 Gbit/second lobes. This composite spectrum "A0" is transmitted on one channel of a WDM transmitter 15. The WDM transmitter 15 also accepts many other 20 Gbit/sec signals (A1, A2, A3 . . . An) of like kind, and simultaneously transmits them on adjacent WDM channels over an optical fiber 16.

The composite WDM signal transmitted over the optical fiber 16 is processed by an electro-optical WDM receiver 17 that reproduces the individual 20 Gbit BEM microwave spectra (A0, A1, A2 . . . . An). The two 10 Gbit/sec lobes of the 20 Gbit/sec BEM spectra are then filtered apart using a splitter 18 and two bandpass filters 19a, 19b comprising a 1–5 GHz filter 19a and a 6–10 GHz filter 19b. The 3 GHz carrier processed by the 1–5 GHz filter 19a is upconverted in an upconverter 20 to 8 GHz. The 10 Gbit/sec lobes are then individually demodulated in two demodulators 21 to generate the originally transmitted data.

In an alternative embodiment of the system 10, instead of using an encoded microwave carrier produced by the BEM modulator 11 (as in FIG. 3b) to intensity modulate the optical carrier, the optical carrier generated within the WDM transmitter 15 may be directly modulated by the BEM modulator 11 to many intensity levels. The spectrum for this embodiment of the system 10 has the same shape as FIG. 3a, but with more than 1 bit/Hz spectral efficiency.

To again summarize the present invention, in a WDM link, each WDM optical channel has a limited microwave passband associated with it. As the WDM carrier spacing diminishes, so does that passband. The present invention applies BEM microwave techniques to maximize the use of that passband. Moreover, because the digital switching electronics necessarily operate at the symbol rate (not the aggregate bit rate), use of BEM techniques allows for more robust noise-insensitive electronics. For example, 10 Gbit on-off keying has a 100 psec symbol period, while a 5 bit/symbol 10 Gbit BEM signal has a 500 psec bit period.

Figure 5:
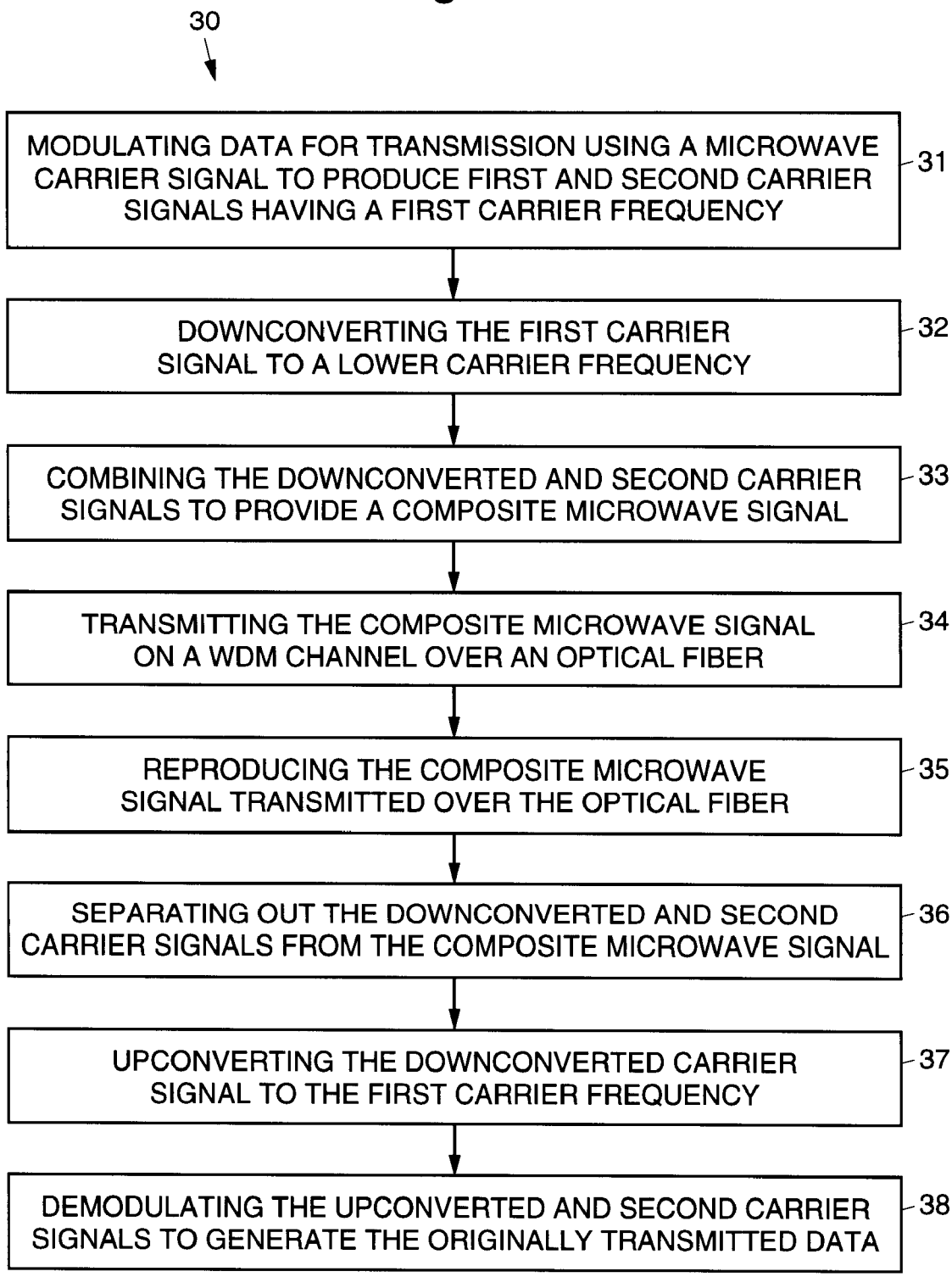
FIG. 5 is a flow chart that illustrates an exemplary data communication method 30 in accordance with the principles of the present invention.

For the purposes of completeness, the following paragraph describes an exemplary data communication method 30 in accordance with the principles of the present invention which is illustrated in FIG. 5. The method 30 comprises the following steps.

Data for transmission is modulated 31 using a microwave carrier signal to produce first and second carrier signals having a first carrier frequency. The first carrier signal is downconverted 32 to a lower carrier frequency. The downconverted and second carrier signals are combined 33 to provide a composite microwave signal. The composite microwave signal is transmitted 34 on a WDM channel over an optical fiber 16. The composite microwave signal transmitted over the optical fiber is reproduced 35. The downconverted and second carrier signals are separated 36 out from the composite microwave signal. The downconverted carrier signal is upconverted 37 to the first carrier frequency. The upconverted and second carrier signals are demodulated 38 to generate the originally transmitted data.

Thus, systems and methods that improve data transmission over a wavelength division multiplexed optical link have been disclosed. It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A data transmission system, comprising:

first and second bandwidth efficient modulation modulators for encoding data for transmission using a microwave carrier signal to produce first and second carrier signals having a first carrier frequency;

a downconverter for downconverting the carrier signal output by the first wavelength division multiplexed modulator to a lower carrier frequency;

a combiner for combining the downconverted and second carrier signals to provide a composite microwave signal;

a wavelength division multiplexed transmitter for transmitting the composite microwave signal on one wavelength division multiplexed channel over an optical fiber;

a wavelength division multiplexed receiver coupled to the optical fiber for reproducing the composite microwave signal transmitted over the optical fiber;

a splitter and filters for separating out the downconverted and second carrier signals from the composite microwave signal;

an upconverter for upconverting the downconverted carrier signal to the first carrier frequency; and first and second demodulators for demodulating the upconverted and second carrier signals to generate the originally transmitted data.

2. The system recited in claim 1 wherein the first carrier frequency is about 8 GHz, and wherein the lower carrier frequency is about 3 GHz.

3. The system recited in claim 1 wherein the modulators use higher order modulation to encode the data.

4. The system recited in claim 3 wherein the higher order modulation comprises M-ary ASK modulation.

5. The system recited in claim 3 wherein the higher order modulation comprises M-ary PSK modulation.

6. The system recited in claim 3 wherein the higher order modulation comprises M-ary QAM modulation.

7. The system recited in claim 1 wherein the wavelength division multiplexed transmitter transmits a plurality of composite microwave signals on a plurality of channels over the optical fiber, and wherein the wavelength division multiplexed receiver reproduces the plurality of composite microwave signals transmitted over the optical fiber.

8. The system recited in claim 1 wherein the bandwidth efficient modulation modulators comprise means for intensity modulating the optical carrier within the wavelength division multiplexed transmitter.

9. A data communication method comprising the steps of:

modulating data for transmission using a microwave carrier signal to produce first and second carrier signals having a first carrier frequency;

downconverting the first carrier signal to a lower carrier frequency;

combining the downconverted and second carrier signals to provide a composite microwave signal;

transmitting the composite microwave signal on a channel over an optical fiber;

reproducing the composite microwave signal transmitted over the optical fiber;

separating out the downconverted and second carrier signals from the composite microwave signal;

upconverting the downconverted carrier signal to the first carrier frequency; and demodulating the upconverted and second carrier signals to generate the originally transmitted data.

10. The method recited in claim 9 wherein the first carrier frequency is about 8 GHz, and wherein the lower carrier frequency is about 3 GHz.

11. The method recited in claim 9 wherein the step of modulating the data for transmission comprises the step of modulating the microwave carrier using higher order modulation.

12. The method recited in claim 11 wherein the higher order modulation comprises M-ary ASK modulation.

13. The method recited in claim 11 wherein the higher order modulation comprises M-ary PSK modulation.

14. The method recited in claim 11 wherein the higher order modulation comprises M-ary QAM modulation.

15. The method recited in claim 9 wherein the step of modulating the data for transmission comprises the step of intensity modulating the optical carrier.

* * * * *